Patented Feb. 21, 1950

2,498,602

UNITED STATES PATENT OFFICE 2,498,602

VINYL CHLORIDE COMPOSITIONS

Joachim Dazzi and Charles H. Rector, Jr., Dayton, Ohio, assignors to Monsanto Chemical Company, St. Louis, Mo., a corporation of Delaware No Drawing. Application May 27, 1948,
Serial No. 29,645

6 Claims. (Cl. 260—30.8)

This invention relates to new plasticized vinyl chloride resins having valuable properties as are hereinafter more fully described.

The primary purpose of this invention is to provide new methods of plasticizing vinyl chloride resins. A further purpose of this invention is to provide new plasticized polyvinyl chloride and vinyl chloride polymers by the incorporation of a group of aromatic esters.

It has been found that esters of the following structure:

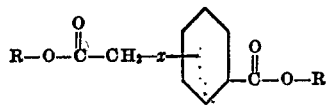

wherein $x$ is a radical of the group consisting of oxygen and divalent sulfur, and R is a hydrocarbon radical, an oxa-hydrocarbon radical or a thia-hydrocarbon radical, in which there are a total of 4 to 12 carbon, oxygen and sulfur atoms in the molecular structure. Typical examples of esters which may be used in the practice of this invention are: the dibutyl-, dilauryl-, the dibutoxyethyl, the di-2-ethylhexyl, and the di-3-oxa-n-pentyl esters of o-carboxylicphenoxyacetic acid and similar esters of isomeric carboxyphenoxyacetic acids and esters of the thio-analogues thereof, such as:

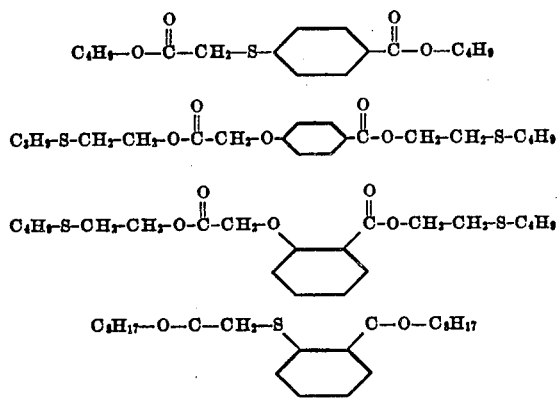

The esters are valuable plasticizers for polyvinyl chloride and copolymers of more than 70 percent of vinyl chloride and up to 30 percent of other polymerizable monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized and upon its molecular weight it is generally found that from 5 to 50 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the volatilization of the plasticizer during use.

The value of the plasticizers are estimated by three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about —50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of —20 to —30° C. are desirable, otherwise 0° C. is satisfactory. If the polymer is to be subjected to elevated temperatures a volatility of 5 to 10 percent is advantageous, otherwise volatilities as high as 25 percent are often not objectionable. The volatilities and flex temperatures, of polymer plasticizer blends are difficult to predict and often have no apparent relationship to the physical constants of the plasticizer.

The new plasticizers are of general utility in softening vinyl chloride polymers. They may be used as the only plasticizing component in a compounded vinyl chloride polymer, or they may be used in conjunction with other plasticizers. It is frequently desirable to use a plurality of different plasticizers.

Further details of the practice of this invention are set forth with respect to the following specific examples.

Example 1

The new type of plasticizers were evaluated by blending 40 parts by weight of the plasticizer with 60 parts by weight of polyvinyl chloride and one part by weight of a conventional stabilizing agent. The samples were tested for low temperature flexibility utilizing the Clash-Berg procedure and for volatility as described above. The dibutyl carboxyphenoxyacetate was found to have a flex temperature of −24° C. and a volatility of 14.8, whereas the di-2-ethylhexyl ester was found to have a flex temperature of −28° C. and a volatility of 2.06 percent. The test data demonstrates that the class of esters are valuable plasticizers for vinyl chloride polymers.

Example 2

The sulfur analogues of the esters tested in the preceding example were evaluated using the identical procedure. The compound utilizing the sulfur analogue of the butyl ester was found to have a flex temperature of −22.2° C. and a volatility of 7.5, whereas the compound including the sulfur analogue of the 2-ethylhexyl ester had a flex temperature of −25.7° C. and a volatility of 1.2 percent.

Although the invention has been described with respect to specific embodiments, it is not intended that the details thereof shall be construed as limitations upon the scope of the invention except to the extent incorporated in the following claims.

We claim:

1. A plasticized vinyl resin composition which comprises a vinyl chloride polymer containing intimately dispersed therein an ester having the structural formula:

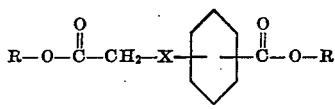

wherein X is an atom of the group consisting of oxygen and divalent sulfur, and R is a radical of the group consisting of hydrocarbon radicals, oxa-hydrocarbon radicals and thia-hydrocarbon radicals in which there are from 4 to 12 carbon, sulfur and oxygen atoms.

2. A vinyl resin which comprises a polyvinyl chloride having intimately dispersed therein from 5 to 50 per cent by weight of an ester having the structural formula:

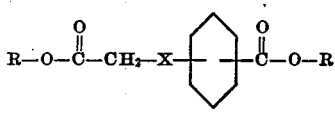

wherein X is an atom of the group consisting of oxygen and divalent sulfur, and R is a radical of the group consisting of hydrocarbon radicals, oxa-hydrocarbon radicals, and thia-hydrocarbon radicals, in which there is a total of from 4 to 12 carbon, oxygen and sulfur atoms.

3. A vinyl resin composition which comprises a copolymer of at least 70 percent of vinyl chloride and up to 30 percent of a monomer of the group consisting of vinyl acetate, ethyl maleate, ethyl fumarate, having intimately dispersed therein from 5 to 50 percent of an ester having the structural formula:

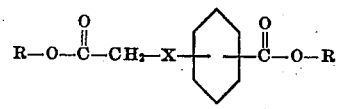

wherein X is an atom of the group consisting of oxygen and divalent sulfur, and R is a radical of the group consisting of hydrocarbon radicals, oxa-hydrocarbon radicals and thia-hydrocarbon radicals, in which radicals there are a total of 4 to 12 carbon, sulfur and oxygen atoms.

4. A plasticized vinyl resin composition which comprises polyvinyl chloride containing intimately dispersed therein from 5 to 50 percent by weight of a dibutyl ester of carboxyphenoxyacetate.

5. A plasticized vinyl resin composition which comprises polyvinyl chloride containing intimately dispersed therein from 5 to 50 percent by weight of a compound having the structural formula:

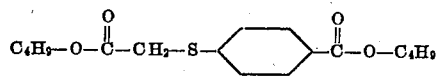

6. A plasticized vinyl resin composition which comprises a copolymer of at least 70 percent of vinyl chloride and up to 30 percent of diethyl maleate, containing intimately dispersed therein from 5 to 50 percent by weight of the dibutyl ester of carboxyphenoxyacetate.

JOACHIM DAZZI.
CHARLES H. RECTOR, Jr.

REFERENCES CITED

The following references are of record in the file of this patent:

UNITED STATES PATENTS

| Number | Name | Date |
|---|---|---|
| 2,166,557 | Stoesser et al. | July 18, 1939 |